June 27, 1967     D. C. HUNN     3,327,749
TRANSVERSE CUTTING ROTARY TOOL BIT
Filed Jan. 24, 1966
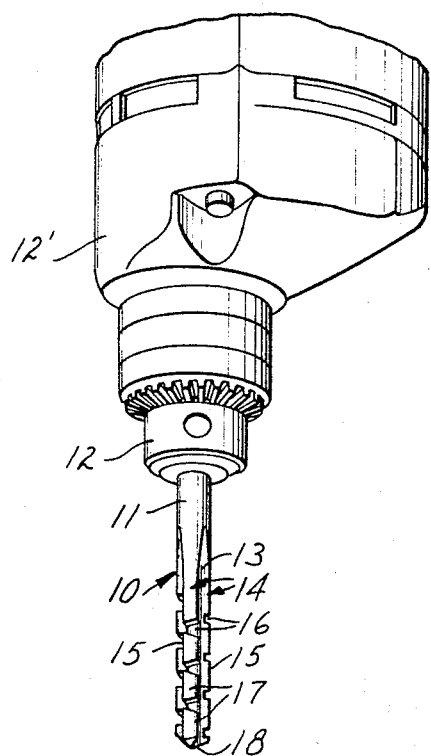
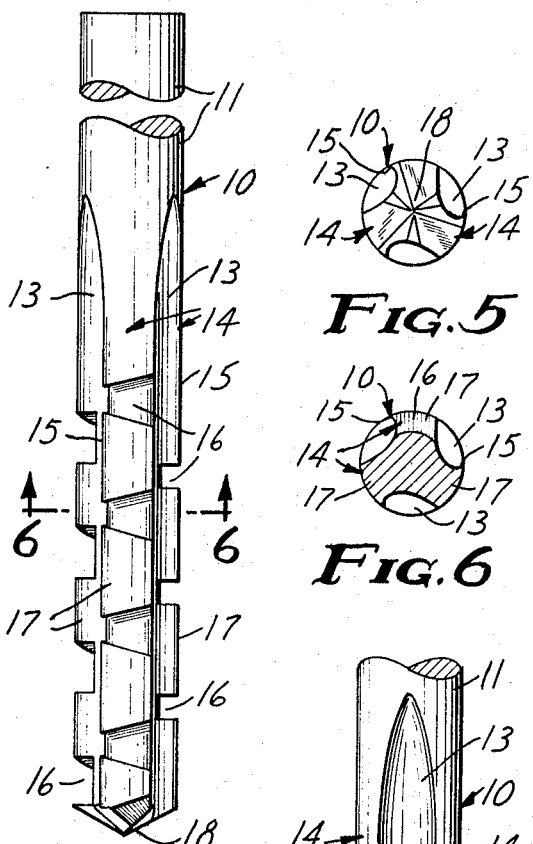
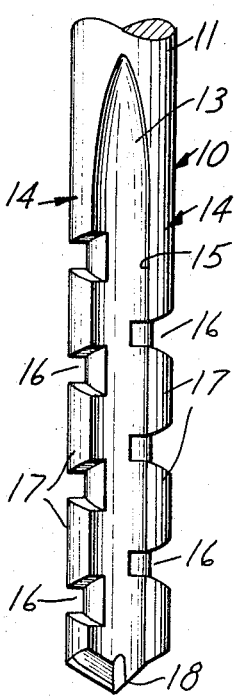
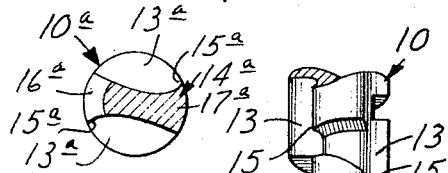
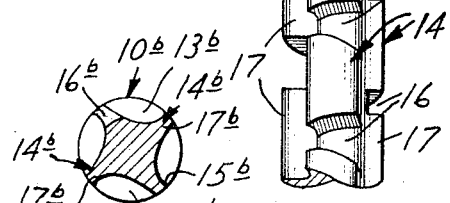
INVENTOR.
DOUGLAS C. HUNN
BY Merchant & Gould
ATTORNEYS United States Patent Office 3,327,749
Patented June 27, 1967

3,327,749
TRANSVERSE CUTTING ROTARY TOOL BIT
Douglas C. Hunn, Minneapolis, Minn., assignor to The Mill-Cut Corporation, a corporation of Minnesota
Filed Jan. 24, 1966, Ser. No. 522,611
2 Claims. (Cl. 145—130)

This invention pertains to a new and improved cutting tool and more particularly to a cutting tool which may be utilized in a hand operated device such as a hand drill, or the like, and which first may be operated as a drill to form a hole in the material after which a transverse cutting action may be accomplished.

In the prior art many devices are disclosed which may be utilized for reaming, lateral cutting, etc. These prior art devices incorporate a large number of disadvantages, the foremost of which are expense in production and inferior operating characteristics. Among the factors which create these disadvantages in the prior art devices are such things as grooves which spiral the working length of the device and cause the device to be drawn into the work as it is operated, teeth which extend outwardly from the outer periphery of the device and are extremely complicated to form and devices having blunt ends so that separate tools must be utilized to form a hole or opening before the prior art device can be utilized.

The present tool is a cutter which may be utilized as a drill or in place of various other devices. In the present tool all of the prior art disadvantages, and especially those specifically set forth above, have been substantially overcome. Because of the unique construction the present device is inexpensive to produce and does not have a tendency to pull in any particular direction during operation. It is anticipated that the present tool will replace a great many hand devices since one tool can perform a plurality of operations, such as drilling, sawing, reaming, etc.

It is an object of the present invention to provide a new and improved cutting tool.

It is a further object of the present invention to provide a cutting tool which is inexpensive to produce.

It is a further object of the present invention to provide a cutting tool which does not have a tendency to pull in any particular direction during operation.

It is a further object of the present invention to provide a cutting tool which can perform a plurality of operations.

These and other objects of this invention will become apparent to those skilled in the art upon consideration of the accompanying specification, claims, and drawings.

Referring to the drawings, wherein like characters indicate like parts throughout the figures:

FIG. 1 is a view in perspective of the present device engaged in the chuck of a hand drill;

FIG. 2 is an enlarged view in perspective of the present device, portions thereof removed, illustrating the cutting edges in detail;

FIG. 3 is an enlarged side view of the present device;

FIG. 4 is a view similar to FIG. 3 with the cutter rotated slightly;

FIG. 5 is an end view of the present device as seen from the lower or working end;

FIG. 6 is a sectional view as seen from the lines 6—6 in FIG. 3; and

FIGS. 7 and 8 are sectional views of modified embodiments of the present device wherein two and four flutes, or longitudinal grooves, respectively, are formed in the cutter.

In the figures the numeral 10 generally designates a cutting tool having a mounting portion 11 adjacent the upper end adapted to be engaged within a chuck 12 of a hand drill 12' or the like. The cutting tool 10 is formed from an elongated cylindrical shaft with a plurality of longitudinal groove 13 formed therein. The grooves 13 extend from the lower tip of the cutting tool 10 to within a predetermined distance of the upper end thereof, which distance forms the mounting portion 11. A plurality of lands 14 are formed between the grooves 13 and have an arcuate outer periphery with a diameter equal to the diameter of the shaft.

In the present embodiment the cutting tool 10 is fluted, that is, the grooves 13 are somewhat rounded, to provide for the smooth removal of material from the piece of work. The leading edge of each of the lands 14 is undercut somewhat by the grooves 13 to provide a cutting edge 15. In this embodiment there are three grooves 13 with three lands 14 therebetween.. However, it should be understood that one skilled in the art could construct the present device with any plurality of grooves therein and still come within the scope of this invention. For example, FIGS. 7 and 8 illustrate embodiments wherein two and four grooves respectively are provided. FIGS. 7 and 8 are similar to FIG. 6 and similar parts have the same numbers with a's and b's added to differentiate the embodiments.

In FIG. 1 the hand drill 12 illustrated is a standard quarter inch hand drill and the shaft of the cutting tool 10 has a diameter of one quarter of an inch. The longitudinal grooves 13 are formed with a maximum depth of approximately .07 inch. While it may be desirable to use a cutting tool having a different diameter shaft for different hand devices, it should be understood that the depth of the longitudinal grooves 13 will have approximately the same ratio to the diameter of the shaft.

Each land 14 between two longitudinal grooves 13 has a plurality of circumferential grooves 16 formed therein. the circumferential grooves 16 form cutting teeth 17 therebetween. Each circumferential groove 16 is cut to a depth of approximately .06 inch and equally spaced along the lands 14. Grooves 16 in adjacent lands 14 are staggered slightly so that each succeeding tooth 17 removes an additional portion of the work. The circumferential grooves 16 are somewhat wedge shaped with the smaller widths being positioned at the cutting edge 15 and the larger width following it during operation. Thus, each tooth 17 has a relatively wide cutting edge 15 and a narrower trailing edge to provide a certain amount of relief during operation and prevent binding or the like.

In the present embodiment the shaft of the cutting tool 10 is aproximately 3$\frac{3}{16}$ inches long with the mounting portion 11 being approximately 1$\frac{7}{16}$ inches long. The longitudinal grooves 13 are approvimately 1$\frac{5}{8}$ inches long and the lands 14 therebetween each have approvimately four circumferential grooves 16 therein. Each circumferential groove 16 is approximately $\frac{5}{64}$ inch wide at its narrowest point and $\frac{1}{8}$ inch wide at its widest point. The sides of the circumferential grooves 16 lie at an angle of aproximately 7° with respect to a line perpendicular to the longitudinal axis of the cutting tool 10. The grooves 16 are spaced so that the teeth 17 therebetween are approximately $\frac{3}{16}$ inch wide at their narrowest point or the trailing edge while the cutting edge or the widest point is approximately $\frac{7}{32}$ inch wide. It should be understood that these dimensions were chosen for this specific embodiment but that variations therein might be made by one skilled in the art and the tool would still come within the scope of this invention.

The lands 14 at the lower end, or the end opposite the mounting portion 11, of the cutting tool 10 are tapered sharply to a point and shaped to form a bit 18 for cutting or drilling holes in material along the longitudinal axis of the cutter 10. By providing a bit 18 at the end of the cutting tool 10 a plurality of operations can be provided with a single cutting tool 10. That is, the cutting tool 10 can be utilized for drilling holes, as well as transverse sawing, reaming, etc.

Thus, the present cutting tool 10 can be utilized for drilling, sawing, reaming, etc. and the operator need only purchase a single motorized device, such as a quarter inch hand drill. The tool 10 is relatively inexpensive to produce since the teeth 17 are provided by forming longitudinal grooves 13 and circumferential grooves 16 in the shaft. Also, because of the unique position and design of the longitudinal grooves 13 and the circumferential grooves 16 the tool 10 has no tendency to pull in any particular direction during operation.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A cutter for use in hand tools and the like comprising:
   (a) a cylindrical shaft having a portion adjacent one end adapted to be engaged in a tool chuck;
   (b) a plurality of grooves extending longitudinally from said portion to the opposite end of said shaft and defining a plurality of lands therebetween, each of said grooves being flutes a portion of which underlies the adjacent land to provide a cutting edge therealong;
   (c) a plurality of circumferential, equally spaced grooves formed in each of the lands between said longitudinal grooves with each circumferential groove being symmetrical about a plane and each of said planes being approximately perpendicular to the longitudinal axis of said shaft, the circumferential grooves in adjacent lands being longitudinally displaced relative to each other; and
   (d) said opposite end of said shaft being formed to provide means for drilling a hole.

2. A cutter for use in hand tools and the like substantially as set forth in claim 1 wherein each of the circumferential grooves is somewhat wedge shaped with the narrower portion preceding the wider portion during operation.

References Cited

UNITED STATES PATENTS 2,623,552   12/1952   Compton et al. _____ 145—130

WILLIAM FELDMAN, *Primary Examiner.*

R. V. PARKER, JR., *Assistant Examiner.*